United States Patent [19]

Pobocik, deceased et al.

[11] 4,299,527

[45] Nov. 10, 1981

[54] WHEELCHAIR LOADING AND UNLOADING DEVICE

[75] Inventors: Anthony B. Pobocik, deceased, late of Swartz Creek, Mich.; by Rose Pobocik, heir, by Marion Turner nee Pobocik, heir, Gaines, Mich.; by Bernard Pobocik, heir, Flushing, Mich.; by Michael Pobocik, heir, Gaines, Mich.; by James Pobocik, heir, Swartz Creek, Mich.; by Thomas Pobocik, heir, Flushing, Mich.; by Robert Pobocik, heir, Flint, Mich.; by Agnes Pobocik, heir, 3293 S. Seymour Rd., Swartz Creek, Mich. 48473

[73] Assignee: Agnes Pobocik, Swartz Creek, Mich.

[21] Appl. No.: 139,554

[22] Filed: Apr. 11, 1980

[51] Int. Cl.[3] .................... B60P 3/06

[52] U.S. Cl. .................... 414/462; 414/549; 414/917; 414/921

[58] Field of Search .................... 414/921, 917, 549, 547, 414/462, 544, 542, 541

[56] References Cited

U.S. PATENT DOCUMENTS

| | | | |
|---|---|---|---|
| 3,638,813 | 2/1972 | Strong | 414/544 X |
| 3,823,839 | 7/1974 | Petzing et al. | 414/541 X |
| 3,913,759 | 10/1975 | Deacon | 414/921 X |
| 3,957,164 | 5/1976 | Brown | 414/542 |

FOREIGN PATENT DOCUMENTS

| | | | |
|---|---|---|---|
| 2617754 | 11/1977 | Fed. Rep. of Germany | 414/542 |
| 2807567 | 8/1978 | Fed. Rep. of Germany | 414/462 |

*Primary Examiner*—Charles A. Marmor
*Attorney, Agent, or Firm*—Gifford, VanOphem, Sheridan & Sprinkle

[57] ABSTRACT

A device provided for loading and unloading a wheelchair into and out from a motor vehicle while the wheelchair is in a folded condition. The device comprises an elongated track which secured to the motor vehicle and preferably laterally across the vehicle in front of the vehicle rear seat. A carriage assembly is longitudinally slidably mounted to the track while a reversible electric motor longitudinally drives the carriage assembly along the track between a retracted and an extended position. With the carriage assembly in its extended position, an elongated wheelchair engaging bar is positioned underneath the wheelchair seat. A second electric motor, upon activation, lifts the wheelchair engaging bar and, in doing so, lifts the wheelchair off from the ground. With the wheelchair in an elevated position, activation of the first motor retracts the carriage assembly with the attached wheelchair into the vehicle for storage during transportation of the motor vehicle. When use of the wheelchair is again desired, the first motor is activated to move the carriage assembly with the attached wheelchair to its extended position and so that the wheelchair is positioned outside of the motor vehicle. The second electric motor is then activated which lowers the wheelchair to the ground.

7 Claims, 6 Drawing Figures

Fig-1
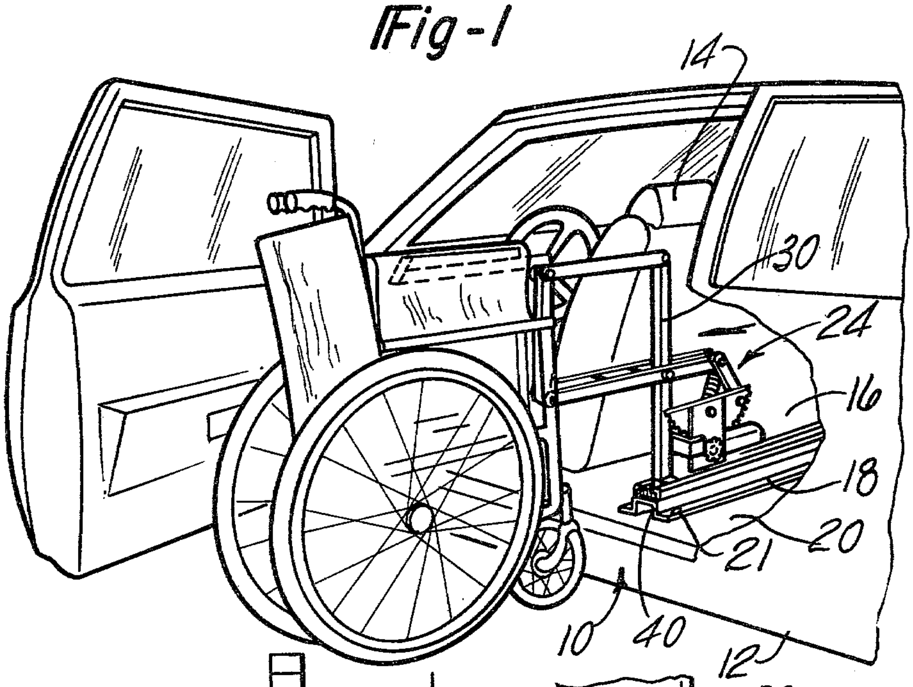
Fig-2
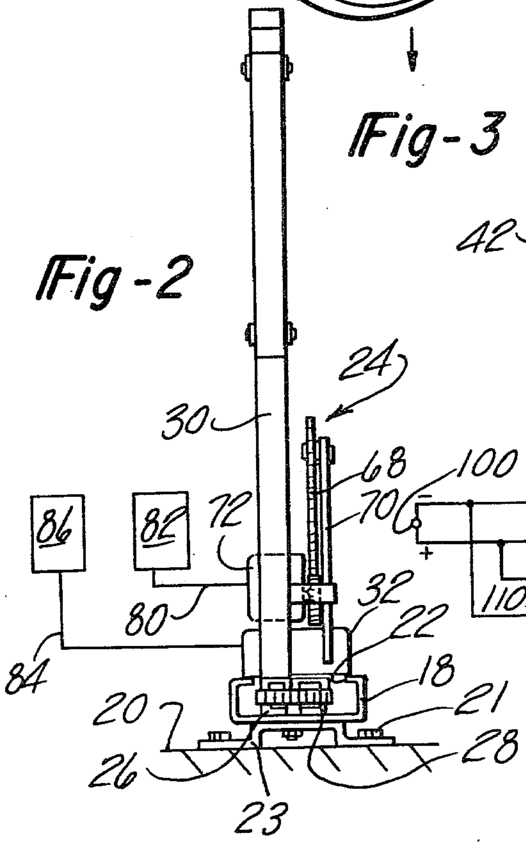
Fig-3
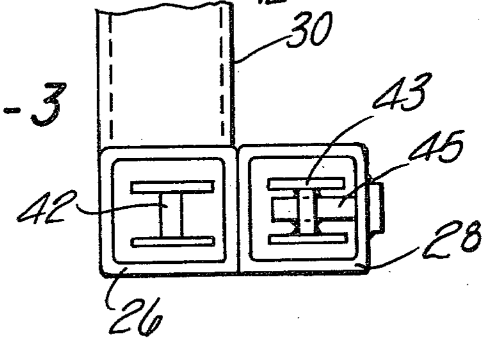
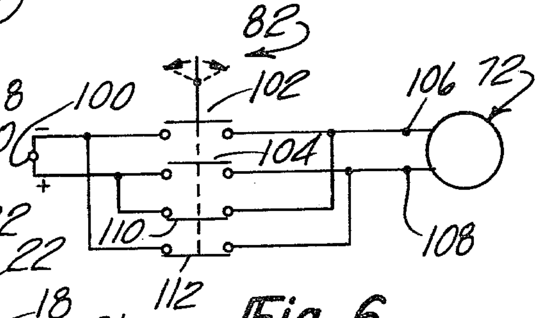
Fig-6

WHEELCHAIR LOADING AND UNLOADING DEVICE

BACKGROUND OF THE INVENTION

I. Field of the Invention

The present invention relates generally to wheelchair carriers and, more particularly, to a wheelchair carrier which carries a collapsed wheelchair in a motor vehicle.

II. Description of the Prior Art

Many paraplegics and other persons confined to wheelchairs are nevertheless capable of driving motor vehicles such as cars, vans and the like. Such vehicles, of course, must be especially equipped with hand controls to permit the control of the vehicle's throttle and brake systems.

During operation of the motor vehicle by the disabled person, the wheelchair is stored behind the front seat of the motor vehicle. The wheelchair seat and back are constructed of a flexible material, such as fabric, to permit the wheelchair to collapse from its sides and towards its center.

In order to drive the motor vehicle, the disabled person typically wheels him or herself to the car, opens the door and swings him or herself onto the front seat of the car. Once this has been accomplished, the wheelchair must be collapsed and then manually dragged into the back seat of the vehicle. While this procedure may be acceptable to disabled persons who are young and/or strong, many disabled persons are simply physically unable to collapse the wheelchair and then drag the collapsed wheelchair into the back seat of the vehicle. Consequently, many disabled persons are unable to travel independently despite their ability to drive a specially equipped car.

SUMMARY OF THE PRESENT INVENTION

The present invention provides a solution for this problem by providing a device for loading and unloading a collapsed wheelchair into and out from the rear seat of a motor vehicle.

In brief, the device according to the present invention comprises an elongated track which is secured laterally across the motor vehicle to the vehicle floor and behind the driver's seat. A carriage assembly is slidably mounted on the track and movable between a retracted and an extended position. A reversible electric motor longitudinally drives the carriage assembly along the track by a chain and sprocket arrangement.

The carriage assembly includes an upright support having a wheelchair engaging bar connected to it so that the bar extends generally horizontally outwardly from the upright support. A second reversible electric motor is mounted on the carriage and is drivingly connected to a segmented gear rotatably mounted on the carriage. The segmented gear is connected, via linking members, to the wheelchair engaging bar so that upon activation of the second motor, the second motor vertically drives the wheelchair engaging bar between an upper and lower position. Moreover, the linking members are arranged such that the wheelchair engaging bar is maintained in substantially a horizontal position.

In the operation of the device according to the present invention, the first electric motor is activated thus moving the carriage assembly to its extended position and, in doing so, the wheelchair engaging bar protrudes outwardly from the motor vehicle. In addition, the wheelchair engaging bar is moved to its lower position by the second electric motor so that the bar is positioned underneath the wheelchair seat.

The second electric motor is then activated thus elevating the bar and, in doing so, the wheel chair collapses inwardly from its sides. Further elevation of the bar will lift the wheelchair off from the ground and to a position in which the now collapsed wheelchair registers with the opening to the rear seat of the vehicle. The first electric motor is then activated which moves the carriage assembly with the attached wheelchair into the interior of the motor vehicle and behind the driver's seat.

In order to unload the wheelchair from the motor vehicle, the above described process is reversed. Moreover, the switch controls for the electric motor are preferably readily accessible to the disabled person sitting in the driver's seat of the motor vehicle.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a perspective view illustrating the wheelchair carrier according to the present invention;

FIG. 2 is an end view of the wheelchair carrier according to the present invention;

FIG. 3 is a fragmentary view showing a portion of the wheelchair carrier and enlarged for clarity;

FIG. 6 is a schematic diagram for the actuation of the motors.

DETAILED DESCRIPTION OF THE PRESENT INVENTION

Figure 4:
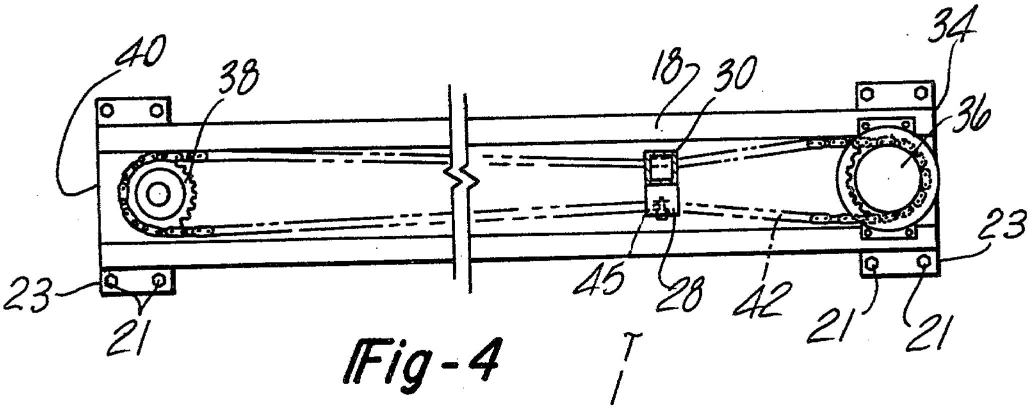
FIG. 4 is a top view of the wheelchair carrier and with parts removed for clarity.

With reference first to FIGS. 1 and 2, the wheelchair carrier 10 according to the present invention is thereshown mounted in a motor vehicle 12, such as a car having a driver's seat 14 and a rear seat area 16. The device 10 comprises an elongated track 18 which is rigidly secured to the vehicle floor 20 by bolts 21 extending through brackets 23 behind the driver's seat 14 and so that the track 18 extends generally laterally across the motor vehicle. The brackets 23 are preferably adjustable to compensate for variations in automobile floors. The track 18 is generally C-shaped in cross section thus defining a longitudinal slot 22 which faces upwardly. In addition, the track 18 can be made telescopic to accommodate vehicles of different widths.

Referring now to FIGS. 1–3, a carriage assembly 24 is longitudinally slidably mounted to the track 18. The carriage assembly 24 includes a pair of square tubes 26 and 28 which are positioned side by side within the track 18 while an elongated upright support 30 is secured to and extends upwardly from the tubes 26 and 28. The engagement of the tubes 26 and 28 with the track 18 prevent twisting and/or pivotal movement of the carriage assembly 24.

Referring now to FIGS. 2–4, a reversible electric motor 32 is secured at one end 34 of the track 18 for longitudinally driving the carriage assembly 24 along the track 18 between a retracted position and an extended position. The electric motor 32 is drivingly connected to a drive sprocket 36 at the end 34 of the track while an idler sprocket 38 is rotatably mounted at the opposite end 40 of the track 18. An endless chain 42 is connected around the sprockets 36 and 38 so that the chain 42 passes through the interior of the tube 28 in one direction and, conversely, passes through the interior of the tube 26 in the opposite direction. One chain link 43 (FIG. 3), however, is rigidly secured to the tube 28 as by welding a pin 45 to both the tube 28 and the chain 42. Thus, that the rotation of the motor 32 longitudinally drives the carriage assembly 24 along the track 18 in dependence upon the direction of rotation of the reversible motor 32.

As shown in FIG. 2, the activation of the motor 32 is controlled by means of a cable 84 and switch 86 arrangement. Preferably, the switch 86 is positioned in the front seat 14 of the vehicle 12 and readily accessible to a person sitting in the driver's seat. The switch 86 can also be mounted in the dash of the vehicle.

Figure 5:
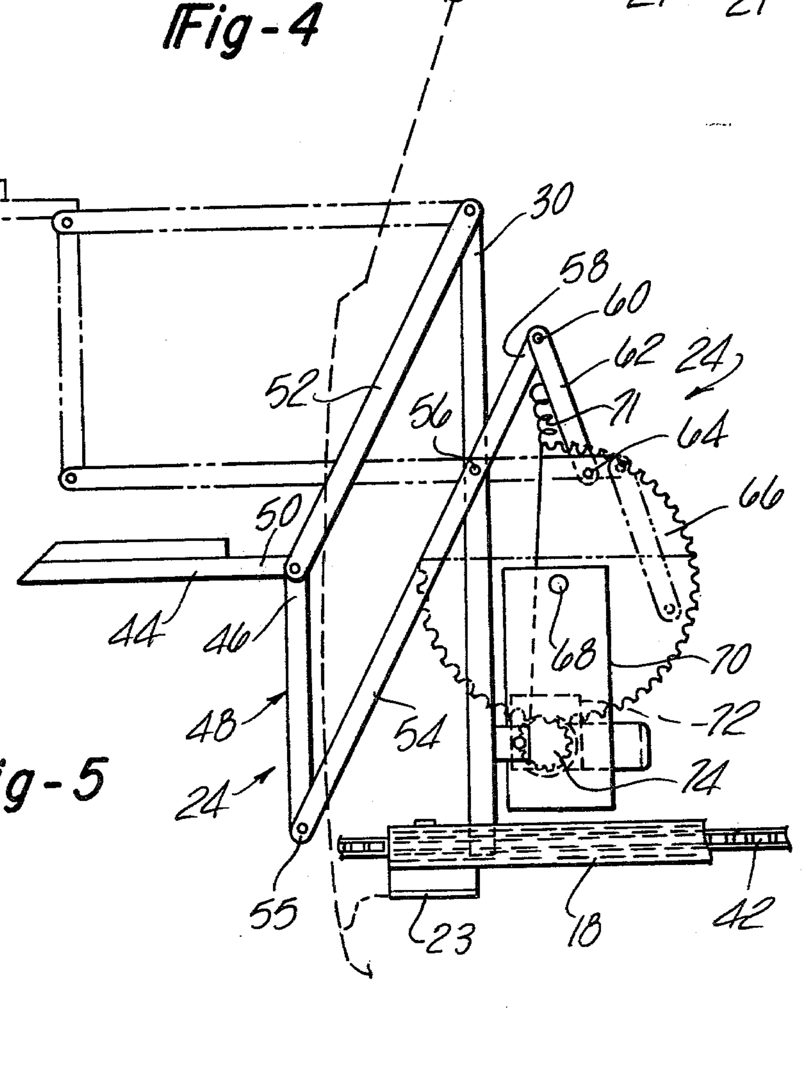
FIG. 5 is a side view of the wheelchair carrier with parts removed and illustrating the operation of the wheelchair carrier.

With reference now to FIG. 5, the device 10 according to the present invention further comprises an elongated wheelchair engaging bar 44 which engages and lifts the wheelchair into the vehicle 12 in a fashion which will be subsequently described. The bar 44 can also include adjustment position holes in order to accommodate different size wheelchairs. One end 46 of an elongated support member 48 is rigidly secured to one end 50 of the bar 44 while an elongated cross link 52 is pivotally connected at one end to the upper end of the upright support 30 and, at its other end, to the junction of the bar 44 with the support member 48.

The lower end of the support member 48 is pivotally connected to one end 55 of an elongated lever arm 54 which is pivotally connected at a midpoint 56 to the upright support 30 at a position below the cross link 52. The cross link 52 is substantially equal in length to the lever arm 54 between its midpont 56 and its end 55 so that the support member 48 is maintained in a generally vertical position parallel to the upright support 30 and, likewise, the wheelchair engaging arm 44 is maintained in a substantially horizontal position. The horizontal orientation of the wheelchair engaging arm 44 is maintained despite pivotal action of the lever arm 54 around its central pivot point 56 as will become shortly apparent.

The opposite end 58 of the lever arm 54 is pivotally connected at 60 to one end of a short connecting link 62. The other end of the connecting link 62 is pivotally connected at 64 to a segmented gear 66 at a position radially spaced from the axis of rotation of the gear 66 and the gear 66 is rotatably mounted to the carriage assembly 24 by an axle 68 and an upright bracket 70. A spring 71 also biases the lever 54 in a clockwise direction to counteract the weight of the bar 44, link 52 and lever 54.

With reference to FIGS. 2 and 5, a second reversible electric motor 72 is mounted to the carriage assembly 24 and has a drive gear 74 which meshes with the segmented gear 66. Rotation of the motor 72 in one direction will thus drive the segmented gear 66 in a clockwise direction (as viewed in FIG. 5) and raise the wheelchair engaging bar 44 to an elevated position, shown in phantom line in FIG. 5. Conversely, reverse rotation of the motor 72 will rotate the segmented gear 66 in a counterclockwise direction and move the wheelchair engaging bar 44 to a lower position, shown in solid line in FIG. 5. Moreover, the activation of the motor 72 is controlled by the disabled person, preferably by an elongated cable 80 and switch 82 mounted in the dash and/or accessible to a person sitting in the driver's seat 14 of the vehicle 12. Moreover, the gear ratio between the gears 74 and 66 is adjusted as required by the size of the automobile.

With reference to FIG. 6 the electrical circuit for the motor 72 is thereshown, it being understood that a like circuit is used to activate the motor 32. The motor 72 is connected to the DC electrical source 100 (typically 12 volts) of the vehicle through the switch 82. Upon depression of the switch 32 switch contacts 102 and 104 simultaneously connect the negative and positive terminals of the electrical source 100 to the motor terminals 106 and 104, respectively. Conversely, as the switch 82 is raised, switch contacts 110 and 112 connect the negative and positive terminals of the electrical source 100 to the motor terminals 108 and 106, respectively and thus reverse the current flow to the motor 72.

With reference now to FIGS. 1 and 5, the operation of the device 10 according to the present invention will now be described. Assuming that the disabled person wishes to load the wheelchair into the vehicle 12, he or she first enters the driver's seat 14 in the conventional fashion and then positions the wheelchair so that it faces toward the opening to the rear seat area 16 of the vehicle.

The person then activates the first reversible motor 32 in order to move the carriage assembly 24 to its extended position and, in doing so, the wheelchair engaging bar 44 protrudes outwardly from the motor vehicle. The second electric motor 72 is then activated to move the bar 44 to its lower position so that the bar 44 can be positioned underneath the flexible seat of the wheelchair. The second electric motor 72 is then again activated in order to move the bar 44 to its upper position whereupon the bar 44 collapses the wheelchair as shown in FIG. 1. The further activation of the motor 72 further elevates the bar 44 which lifts the collapsed wheelchair off from the ground. When the wheelchair registers with the opening into the rear seat of the vehicle, the motor 72 is deactivated.

Thereafter, the first electric motor 32 is activated in order to move the carriage assembly 24 with the now attached wheelchair to the retracted position of the carriage assembly 24 along the track 18. When the carriage assembly 24 reaches its most retracted position, the wheelchair is wholly contained within the back seat area 16 of the motor vehicle 12. The wheelchair can then be lowered slightly, if desired, by activating the motor 72 in order to enhance rear view mirror visibility.

In order to unload the wheelchair from the back seat area 16 of the motor vehicle, the above described procedure is simply reversed. Therefore, a detailed description of the unloading process is thought to be unnecessary and thus, for brevity, will be omitted.

Limit switches can also be used with wheelchair lift in order to automatically stop the motors at predetermined positions and prevent overloading of the motors. Moreover, the actuation of such limit switches can be transmitted to a control panel visible to the user so that the user is aware of the position of the wheelchair at all times.

While the wheelchair lift has been described as powered by electrical motors, hydraulic motors can also be used within the scope and meaning of the present invention. Moreover, a single motor can also be adapted to longitudinally drive the carriage assembly along its track and also to provide the vertical movement of the lift.

The carriage assembly and track are constructed of any suitable material, preferably metal, which provides long durability and performance.

From the foregoing it can be seen that the present invention provides a novel device for loading and unloading a collapsed wheelchair into the back seat area of a motor vehicle. Moreover, both the elevation of the wheelchair into the motor vehicle and the longitudinal movement of the carriage assembly 24 is completely controlled by electric motors so that the device 10 can be easily used despite the age or physical capabilities of the disabled person.

Having described my invention, however, many modifications thereto will become apparent to those skilled in the art to which it pertains without deviation from the spirit of the invention as defined by the scope of the appended claims.

I claim:

1. A device for loading and unloading a collapsible wheelchair into and out from a motor vehicle, said wheelchair having a flexible seat, said device comprising:
an elongated track secured to said motor vehicle,
a carriage assembly longitudinally movably mounted on said track, said carriage assembly including means for engaging a wheelchair exteriorly of the motor vehicle, said engaging means comprising an elongated bar adapted to be positioned underneath and engaging said flexible seat, and means for moving said elongated bar between a lower position and an upper position to elevate the wheel chair by its flexible seat; and
motor means for longitudinally driving said carriage assembly along said track.

2. The invention as defined in claim 1 wherein the carriage assembly further comprises an upright support and means for movably connecting said elongated bar to said upright support so that said bar extends horizontally outwardly from said carriage assembly.

3. The invention as defined in claim 2 and further comprising an elongated support member perpendicularly secured at one end to one end of the elongated bar and wherein said connecting means further comprises an elongated cross link pivotally secured at one end to said end of the support member and pivotally secured at its other end to said upright support and an elongated lever pivotally secured at one end to the other end of the support member and pivotally secured at a midpoint to the upright support.

4. The invention as defined in claim 3 wherein said moving means comprises means for pivoting said lever link about its midpoint whereby said elongated bar moves vertically while remaining substantially horizontal.

5. The invention as defined in claim 3 wherein said moving means comprises a gear wheel, means for connecting the other end of the lever bar to the gear wheel of a position radially spaced from the axis of rotation of said gear wheel and motor means for rotatably driving said gear wheel.

6. The invention as defined in claim 1 wherein said elongated bar extends substantially horizontally outwardly from said carriage assembly and wherein said moving means further comprises means for maintaining said bar in said horizontal position.

7. A device for loading and unloading a wheelchair into and out from a motor vehicle, said wheelchair having a flexible seat, said device comprising:
an elongated track secured to said motor vehicle;
a carriage assembly longitudinally movably mounted on said track, said carriage assembly including means for engaging a wheelchair exteriorly of the motor vehicle,
means for lifting said wheelchair to an elevated position and for simultaneously collapsing said wheelchair, and
motor means for longitudinally driving said carriage assembly along said track.

* * * * *